W. F. FOLMER.
VIGNETTER.
APPLICATION FILED MAR. 10, 1915.
1,197,811.
Patented Sept. 12, 1916.
2 SHEETS—SHEET 2.
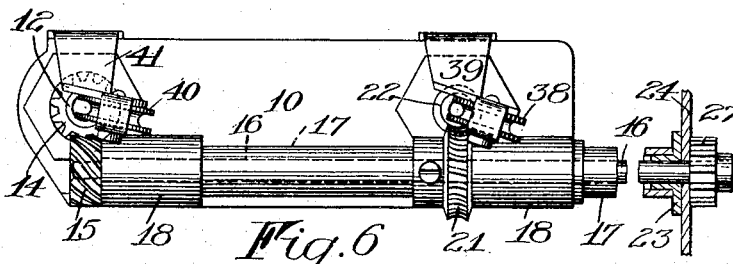
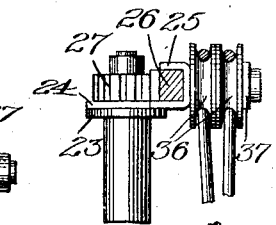
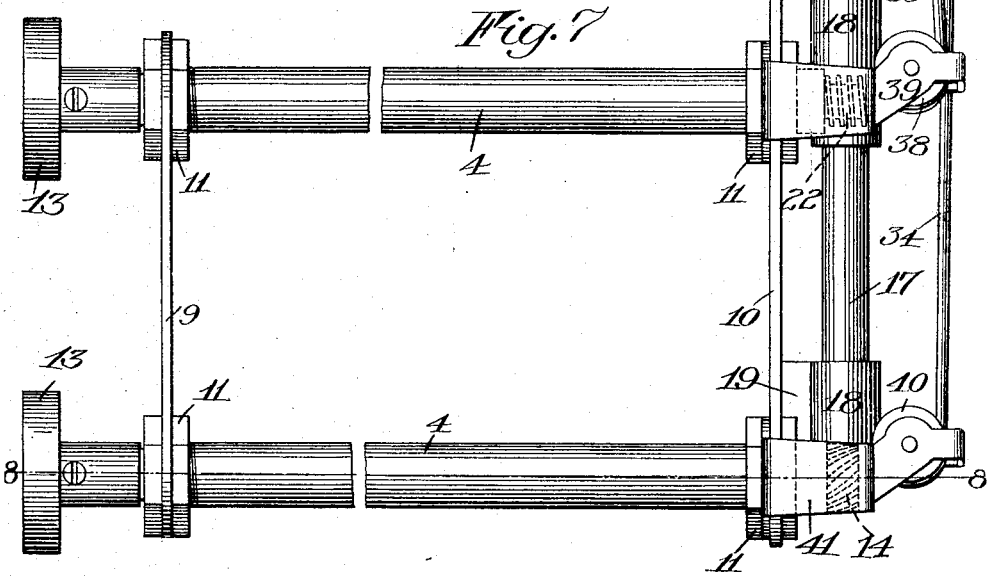
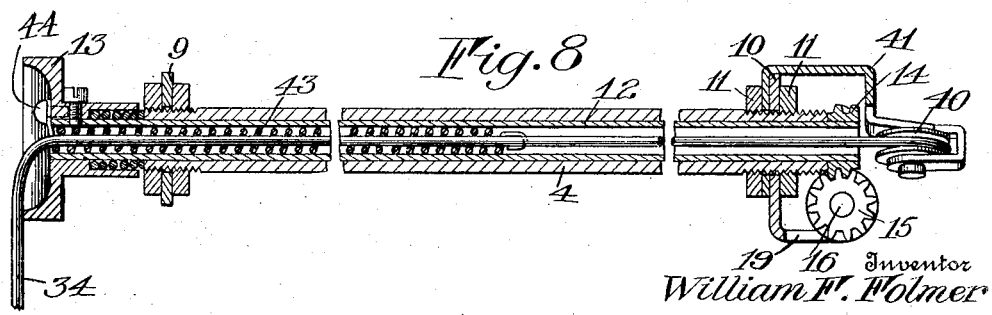
Inventor
William F. Folmer
By [signature]
his Attorneys
Witnesses
[signature]
[signature]

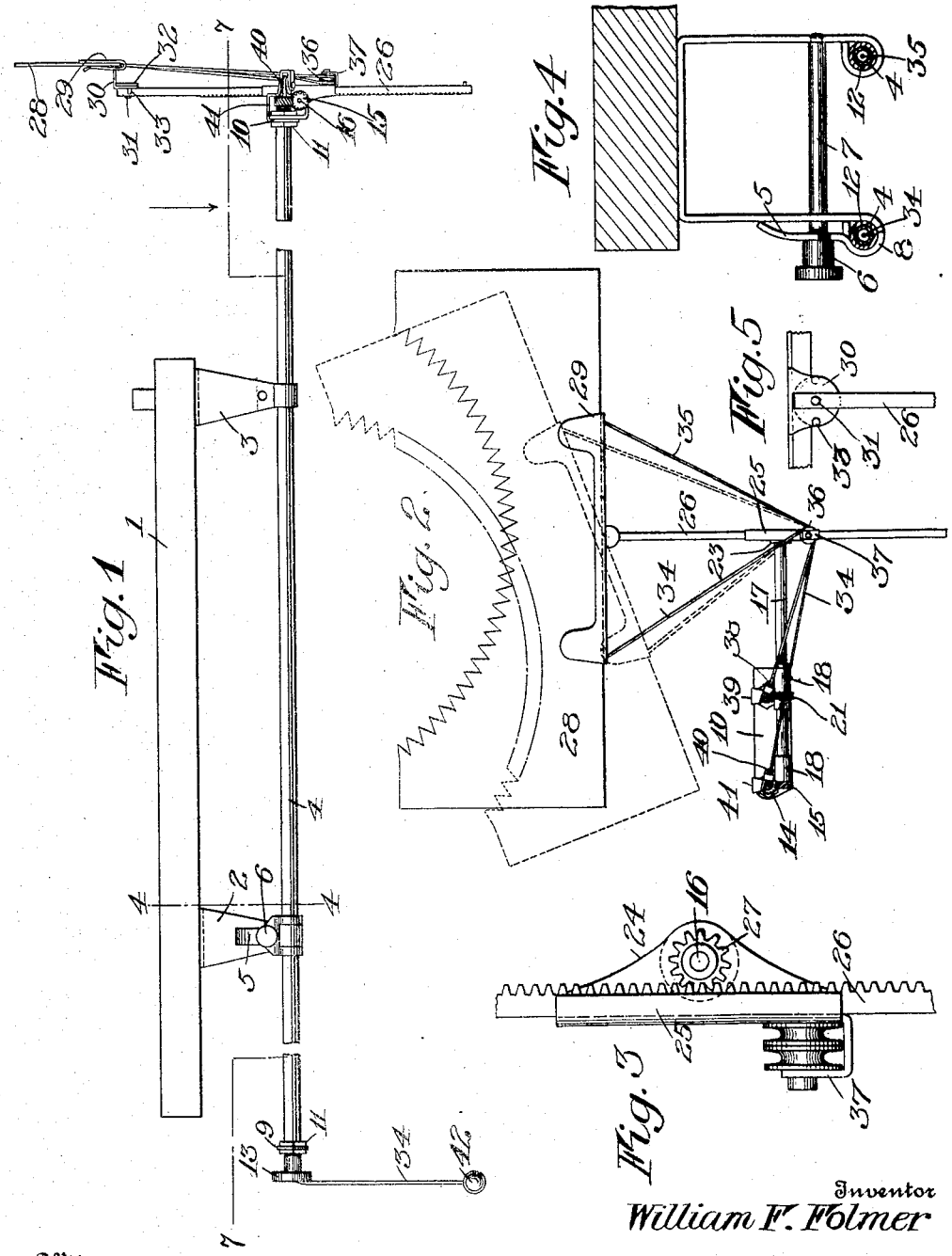

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

VIGNETTER.

1,197,811.      Specification of Letters Patent.     Patented Sept. 12, 1916.

Application filed March 10, 1915. Serial No. 13,327.

*To all whom it may concern:*

Be it known that I, WILLIAM F. FOLMER, of Rochester, in the county of Monroe and State of New York, have invented certain new and useful Improvements in Vignetters; and I do hereby declare the following to be a full, clear, and exact description of the same, reference being had to the accompanying drawings, forming a part of this specification, and to the reference numerals marked thereon.

My present invention relates to photography and more particularly to photographic vignetters of the type in which the rays of light are graded off during the taking of the picture rather than during the printing thereof, and it has for its object to provide a camera attachment of this character in which a vignetting screen interposed between the camera lens and the object may be quickly given a proper adjustment in any direction, namely, forwardly, rearwardly or laterally, these results being accomplished through the medium of conveniently arranged operating devices that work with accuracy and are of efficient and durable construction. To these and other ends the invention resides in certain improvements and combinations of parts all as will be hereinafter more fully described, the novel features being pointed out in the claims at the end of the specification.

In the drawings: Figure 1 is a side elevation of a vignetter constructed in accordance with and illustrating one embodiment of my invention; Fig. 2 is a front end view showing the vignetter screen in elevation; Fig. 3 is a detail side elevation, enlarged, of the mechanism for elevating the screen; Fig. 4 is an enlarged detail section of a clamping device for maintaining one adjustment taken substantially on the line 4—4 of Fig. 1; Fig. 5 is a detail view of the pivotal connection of the vignetter screen with its supporting stem; Fig. 6 is an enlarged front end view of the actuating mechanism shown partly in section with the screen guide removed; Fig. 7 is a top plan view of the apparatus taken in horizontal section through the screen supporting stem, and Fig. 8 is a longitudinal section taken substantially on the line 8—8 of Fig. 7.

Similar reference numerals throughout the several figures indicate the same parts.

My device is particularly adapted for use in connection with the more pretentious photographic instruments, such as studio cameras and referring more particularly to the drawings, 1 may represent the table or bed of such a camera or any main support suitable for the maintenance of a camera in operative position. Supported in bracket guides 2 and 3 on the under side of the table are a pair of tubular casings or extension supports 4 that are adapted to slide longitudinally in the guide when pushed toward and from the object to be photographed to give the in and out adjustments of the screen hereinafter designated. The bracket guide 2 or any one of them may include a clamping device for securing the casings or supports in any position to which they may be so adjusted, and in the present instance, the guiding portion is extended upwardly to form a resilient tongue 5 which bears against the body of the bracket and may be placed under greater or less tension through the adjustments of a clamping nut 6 on a bolt 7 extending between the two arms of the bracket which hold the respective casings 4, as shown in Fig. 4. Tightening the nut 6 causes the knuckle portion 8 of the tongue 5 to grip the casing, as will be understood.

The two casings or extension supports 4 are maintained in rigid relationship by yoke plates 9 and 10 connecting their corresponding ends and secured thereon between threaded nuts 11, as shown, or otherwise. Within each casing or extension member 4 is a tubular rotary shaft 12 the rear end of which projects beyond the end of the casing and has fixed thereto a centrally apertured hand knob 13, while the forward end also projects beyond the other end of the casing in each instance. Taking first the lower shaft shown in Figs. 7 and 8, the said projecting end thereof is fitted with a spiral gear 14 meshing with a similar gear 15 on the projecting end of a transverse shaft 16 adapted to rotate within an outer tubular shaft 17. The last named shaft turns in bearings 18 formed on brackets 19 and 20 respectively mounted on the casings 4 and held between the nuts 11 in company with the yoke plate 10. This outer shaft 17 has fixed thereto at an intermediate point a worm gear 21 with which meshes a worm 22 on the forwardly projecting end of the other shaft 12. It will thus be seen that rotation of one shaft 12 through the medium of its knob 13 will rotate the inner transverse shaft 16 independently of the outer one 17, while rotation of the other shaft 12 will correspondingly rotate the outer tubular shaft 17 independently of the shaft that it incloses.

On the outer end of the tubular shaft 17 is carried a face plate 23 (Figs. 6 and 7) rigid therewith and having secured to it the flange 24 of the U-shaped head 25 that receives and forms a vertical guide for a toothed stem 26. Meshing with the teeth on this stem is a gear 27 fixed to the outer end of the inner shaft 16 beyond the flange 24. The vignetter screen or card 28 which may be of any approved design, is carried at the upper end of this stem 26. A holder 29 therefor is pivotally connected to the stem by an offset ear 30 at 31 beneath a friction disk 32 and the ear has stop pins 33 that engage the stem to limit the pivotal movement in two directions. This pivotal movement, it will be seen, allows the screen to rock in a lateral plane relatively to the axis of the camera lens.

By means of the shafts 16 and 17 operated from 13, as previously described, it will be seen that the screen 28 may be adjusted up and down through the movement of its stem 26 in the guide 25 or tilted forwardly and rearwardly through the rotation of the guide head 25.

The lateral tilting of the screen on its pivot 31 is preferably effected by means of flexible operating members 34 and 35 respectively connected at opposite sides of the pivot 31. I prefer to use cords and these cords pass first through sheaves 36 turning on a horizontal axis in a bracket 37 formed, in the present instance, as an extension of the head 25 and from thence one passes over a sheave 38 on an extension 39 of the bracket 20 and the other over a sheave 40 on an extension 41 of bracket 19, both of these sheaves turning on substantially vertical axes and being tangential to the bore of the tubular shafts 12. They are thus directed and pass through the shafts 12 and through the operating knobs 13 thereof from whence they emerge to terminate in grips 42 accessible to the operator, as shown in Fig. 1. By pulling on one of these cords, the screen 28 is rocked in one direction and by pulling on the other, it is rocked in the other direction.

In order that both cords may always be taut, there is secured to each at one end a spring 43 encircling the cord within the shaft, the other end of which spring is fixed, it being, in the present instance, secured by a screw 44 to the knob 13. The tendency of this spring is, in each instance, to pull the cord in its operative direction, but the spring is not sufficiently strong to cause an actuation of the parts operated upon. Thus, one spring acts against the other and aside from performing their function during the alternate actuations of the two cords, they also prevent the slackening of both cords that would otherwise occur when the screen supporting stem 26 is being lowered.

I have described all of the different adjustments of the vignetter screen 28 and how they are effected and as the purposes of these and the general operation of devices of this kind are well known in the art, it is believed that further explanation is unnecessary.

I claim as my invention:

1. In a vignetter, the combination with a main support and a tubular extension support slidable longitudinally therein and carrying a vignetting screen, of a tubular rotary member within the extension support, means operatively connected to the screen to adjust the latter in one direction relatively to the extension support, and a longitudinally movable operating member arranged within the rotary member and connected to the screen to adjust the latter in another direction relatively to the extension support.

2. In a vignetter, the combination with a main support and a tubular extension support slidable longitudinally therein and carrying a vignetting screen, of a tubular rotary member within the extension support, means operatively connected to the screen at one end to adjust the latter in one direction relatively to the extension support and having an apertured operating portion at the other end, and a flexible operating member arranged within the rotary member and connected to the screen at one end to adjust the latter in another direction relatively to the extension support, said operating member being extended through the apertured operating portion of the rotary member.

3. In a vignetter, the combination with a supporting member and an adjustable vignetting screen carried thereby, of a pair of guides, two flexible operating members respectively occupying the guides and connected to the screen to adjust the same in opposite directions, and springs each having one end fixed with respect to a guide and the other end connected to an operating member to impart movement thereto in the operative direction until it becomes taut, the arrangement being such that the two springs act against each other.

4. In a vignetter, the combination with a supporting means and a shaft journaled therein and carrying a head tiltable with the rotation of the shaft and provided with a guide, of a stem movable longitudinally in the guide, a vignetting screen pivoted to the stem and operating members connected to the screen to respectively turn the latter on its pivot in opposite directions.

5. In a vignetter, the combination with a tiltable head having a guide therein, of a stem movable longitudinally in the guide and adapted to tilt with the head, a vignetting screen pivoted to the stem, means for tilting the head, means for moving the stem in its guide and an operating member connected to the screen to turn it on its pivot and comprising a flexible element guided in one of said means.

6. In a vignetter, the combination with a tiltable head having a guide therein and provided with sheaves, of a stem movable longitudinally in the guide and adapted to tilt with the head, a vignetting screen pivoted to the stem, means for tilting the head, means for moving the stem in its guide and flexible operating members connected to the screen to respectively turn the latter on its pivot in opposite directions, said operating members being passed over the sheaves on the head and respectively guided in said means.

7. In a vignetter, the combination with a support and a head having a guide therein carried by the support, of a stem movable longitudinally in the guide, a vignetting screen pivoted to the stem, two flexible operating members connected to the screen to adjust the same in opposite directions, and two springs each having one end fixed to the support and the other end connected to an operating member to maintain it taut against the manipulation of the other operating member and also against the movements of the stem in its guide.

8. In a vignetter, the combination with a supporting means and a tubular shaft journaled therein and carrying a head tiltable with the rotation of the shaft and provided with a guide, of a toothed stem movable longitudinally in the guide, an inner shaft extending through the tubular shaft, a gear on the inner shaft meshing with the stem, two hollow shafts arranged transversely to the first mentioned shafts and geared thereto respectively, a vignetting screen pivoted to the stem and flexible operating members connected to the screen to tilt it in two directions on its pivot and extending through the last mentioned tubular shafts, respectively.

WILLIAM F. FOLMER.

Witnesses:
RUSSELL B. GRIFFITH,
AGNES NESBIT BISSELL.

Copies of this patent may be obtained for five cents each, by addressing the "Commissioner of Patents, Washington, D. C."